Dec. 3, 1968   S. K. HAMBLING   3,414,090
ACTUATOR GUIDE MEANS FOR DISC BRAKE
Filed April 13, 1966
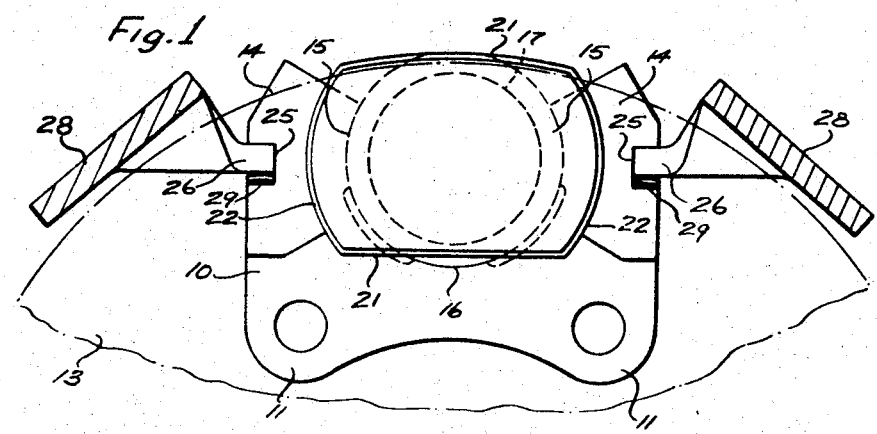
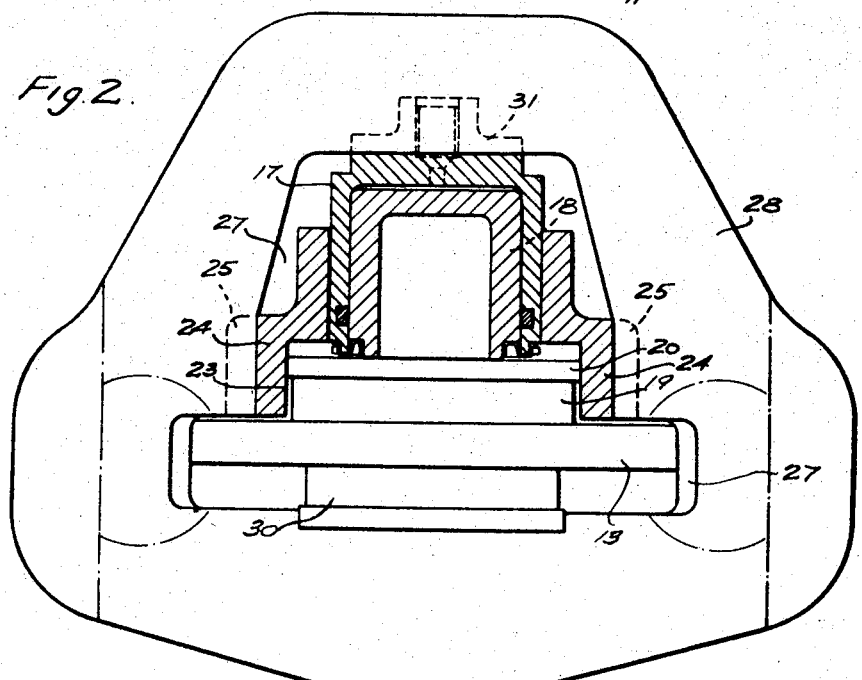
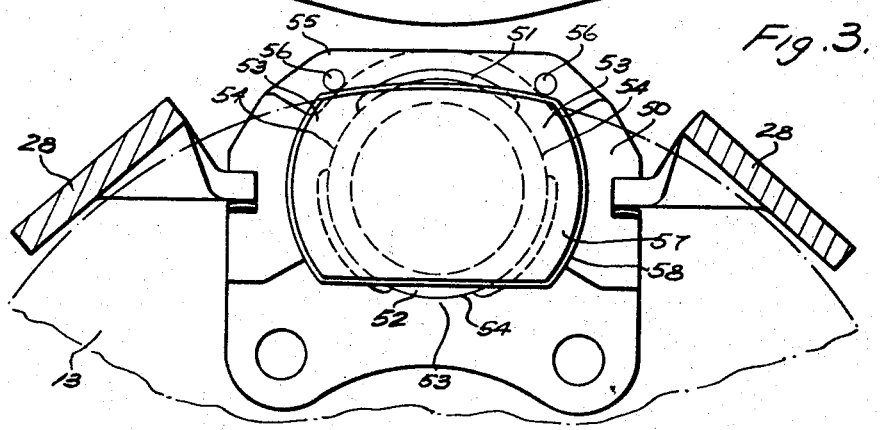

United States Patent Office 3,414,090
Patented Dec. 3, 1968

3,414,090
ACTUATOR GUIDE MEANS FOR DISC BRAKE
Stewart K. Hambling, Tamworth, England, assignor to Girling Limited, Tyseley, England, a British company
Filed Apr. 13, 1966, Ser. No. 542,246
Claims priority, application Great Britain, Apr. 13, 1965, 15,591/65
1 Claim. (Cl. 188—73)

ABSTRACT OF THE DISCLOSURE

In a disc brake of the sliding yoke reaction type one friction pad is applied directly to the disc by a piston working in a cylinder which in turn is slidably guided on radially extending ribs in a stationary member and engaging a minor portion of the outer area of the cylinder to move the yoke axially and bring a second friction pad carried by the yoke into engagement with the opposite face of the disc when the cylinder is pressurized.

---

This invention relates to improvements in disc brakes of the kind in which friction pads are adapted to be urged by hydraulic actuating means into engagement with opposite faces of a rotatable disc.

According to our invention, in a disc brake of that kind a stationary member adapted to be secured to a non-rotatable part adjacent to one side of a rotatable disc incorporates radially extending spaced lugs between which is slidably guided an hydraulic cylinder of which the axis is substantially parallel to that of the disc, and spaced arms extending from the lugs towards the disc provide on their inner surfaces guides for a friction pad which is urged into engagement with the adjacent face of the disc by a piston working in the cylinder and on their outer surfaces guides for a yoke which straddles the stationary member and a portion of the periphery of the disc, the cylinder acting on the yoke to move it axially and bring a second friction pad carried by the yoke into engagement with the opposite face of the disc when the cylinder is pressurised.

In one construction the hydraulic cylinder has a cylindrical external surface and is slidably guide between part-cylindrical surfaces on the inner faces of the lugs and a third part-cylindrical surface on the stationary member between the lugs.

In a modification the hydraulic cylinder is guided between part-cylindrical surfaces on three angularly spaced ribs which project inwardly from a cylindrical bore in the stationary member.

One form of disc brake in accordance with our invention and a modification are illustrated by way of example in the accompanying drawings in which:

FIGURE 1 is a sectional end elevation of the brake in the plane of the disc;

FIGURE 2 is a plan view including a section on the line 2—2 of FIGURE 1; and

FIGURE 3 is a sectional end elevation in the plane of the disc of a modified form of brake.

In the brake illustrated in FIGURES 1 and 2, 10 is the stationary member having two spaced lugs 11 which extend radially inwards from it and are provided with openings 12 adapted to receive bolts by which the member is secured to a stationary part adjacent to one side of a brake disc 13.

The member 10 incorporates radially extending spaced lugs 14 on the inner faces of which are formed part-cylindrical surfaces 15, and a third part-cylindrical surface 16 is provided on the stationary member between the lugs. An hydraulic cylinder 17 arranged with its axis substantially parallel to the axis of the disc has a cylindrical external surface which is slidably guided between the cylindrical surfaces 15 and 16.

A piston 18 working in the hydraulic cylinder 17 is adapted to apply to the disc a directly actuated friction pad assembly comprising a friction pad 19 bonded or otherwise secured to a rigid backing plate 20 having slightly curved or straight and parallel inner and outer edges 21 and part-circular end edges 22 centred on the axis of the disc. These end edges 22 co-operate slidably with complementary part-cylindrical surfaces 23 on the inner sides of the arms 24 which extend forwardly from the lugs 14. The radial dimension of the backing plate 20 is less than its length between the part-circular end edges 22 and to remove the pad when worn the backing plate is rotated through 90° and can then be withdrawn radially through the gap between the arms 24.

Any convenient means may be provided for normally preventing rotation of the backing plate 20 and friction pad 19. For example, they may be retained by removable pins located on the inner or outer side of the backing plate or by one of the mounting bolts which secures the stationary member in position.

The outer sides of the arms 24 are grooved longitudinally at 25 to receive and guide opposed parallel portions 26 of the edge of an opening 27 in a yoke 28 which receives the stationary member 10 and a portion of the periphery of the disc 13. The depth of the grooves 25 is greater than the thickness of the yoke and plate springs 29 are located between the underside of the yoke 28 and the bottom walls of the grooves 25. The yoke 28 is then free to slide axially in the grooves but rattle is prevented. If the springs 29 should fail the yoke 28 will move inwardly and will contact the peripheral edge of the disc 13 which will draw attention to the fact that servicing of the brake is required.

A second friction pad assembly 30, known as the indirectly actuated friction pad assembly, is mounted in the opening 27 in the yoke 28 on the side of the disc 13 remote from the hydraulic cylinder 17, and the end of the opening which receives the cylinder is engaged in a slot 31 in the outer end of the cylinder. When the brake is applied the drag on the indirectly actuated pad 19 is taken through the yoke 28 by one or other of the arms 24 on which the yoke is guided according to the direction of rotation of the disc 13. The component of the drag force tending to turn the yoke 28 is taken partly by the guide and partly by the engagement of the yoke with the outer end of the cylinder 17.

In a modification of the construction described and illustrated in FIGURE 3, a stationary member 50 has an axially extending cylindrical bore or recess 51 in which an hydraulic cylinder 52 is guided, the bore having three angularly spaced inwardly projecting ribs 53 with part-cylindrical surfaces 54 with which a mnior portion of the outer area of the cylinder engages. This arrangement facilitates the provision of a rubber boot at the open end of the cylinder to exclude dirt from the sliding surfaces.

In this construction the stationary member 50 has an outwardly directed radial extension 55 which carries two spaced pins 56 co-operating with the directly actuated friction pad 57 and its backing plate 58 to prevent the assembly from rotating.

I claim:

1. A disc brake comprising a rotatable disc, a stationary housing adapted to be secured to a non-rotatable part adjacent to one side of said disc, actuating means comprising a piston member working in a movable cylinder member of which the axis is substantially parallel to the axis of the disc, an axially extending recess in said housing receiving said cylinder, angularly spaced radially extending ribs in said recess having inner surfaces engaging a minor portion of the outer area of said cylinder and between which said cylinder member is guided, spaced arms extending from said stationary housing towards said disc and having inner and outer surfaces, a yoke straddling said stationary housing and a portion of the periphery of said disc slidably guided for axial movement relative to said disc on the outer surfaces of said arms, a first friction pad assembly for engagement with a face of the disc adjacent to said cylinder member slidably guided for movement towards and away from said disc on the inner surfaces of said arms, one of said members applying said first friction pad assembly to said disc, and a second friction pad assembly carried by said yoke and adapted to be urged into engagement with the opposite face of the disc by the other of said members acting on the yoke to move it axially.

References Cited

UNITED STATES PATENTS

| | | | |
|---|---|---|---|
| 3,158,230 | 11/1964 | Chovings | 188—73 |
| 3,207,268 | 9/1965 | Mossey | 188—73 |
| 3,245,500 | 4/1966 | Hambling et al. | 188—73 |
| 3,269,491 | 8/1966 | Belart et al. | 188—73 |
| 3,285,371 | 11/1966 | Cadiou | 188—73 |
| 3,331,471 | 7/1967 | Redmayne | 188—73 |

FOREIGN PATENTS 828,961   2/1960   Great Britain.

MILTON BUCHLER, *Primary Examiner.*

G. E. A. HALVOSA, *Assistant Examiner.*